Dec. 17, 1940. H. G. CUNNINGHAM 2,224,901
CAMERA DOLLY
Filed July 20, 1937 7 Sheets-Sheet 1

Inventor
Harry G. Cunningham,
By Orl R. Goshaw
Attorney

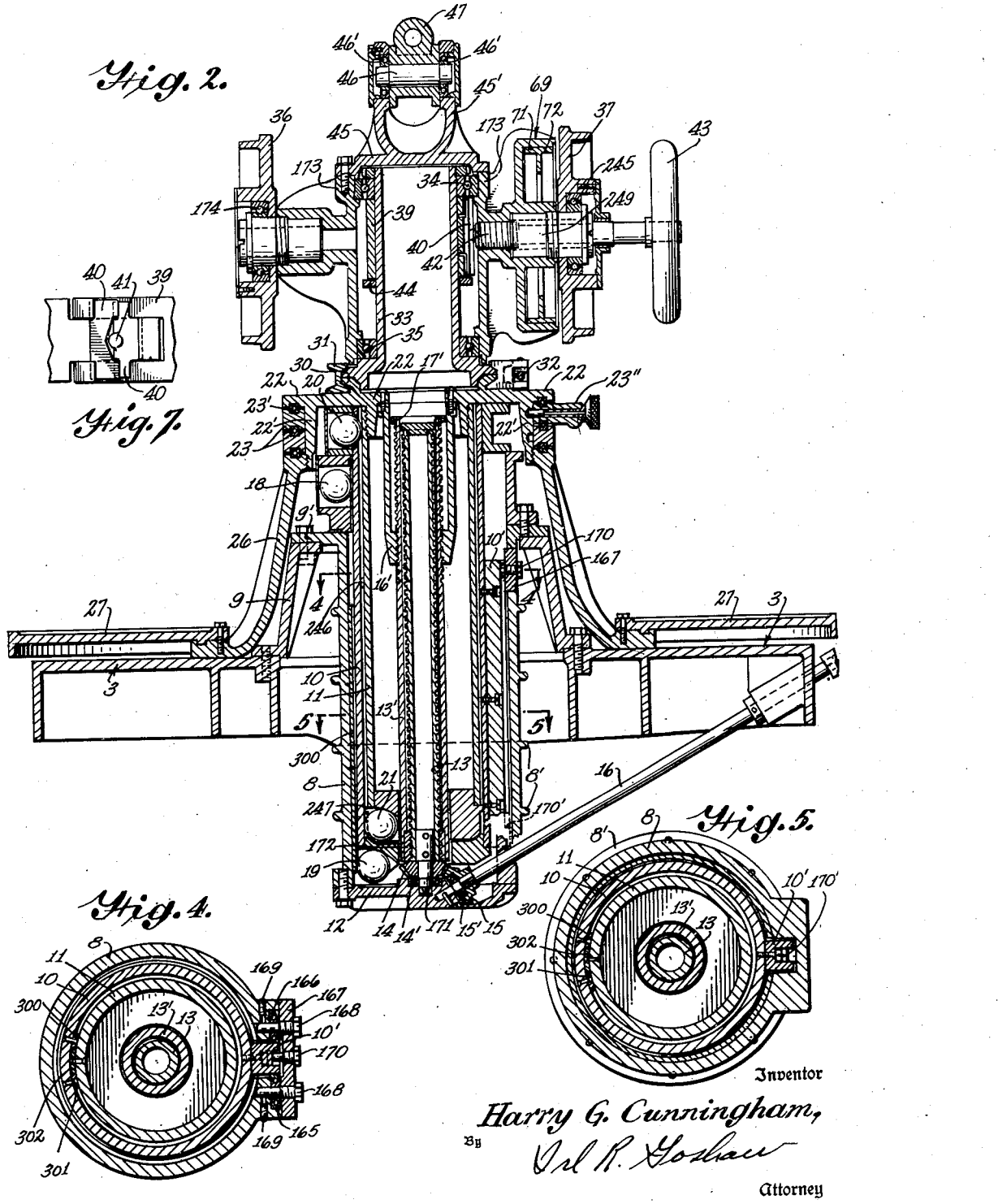

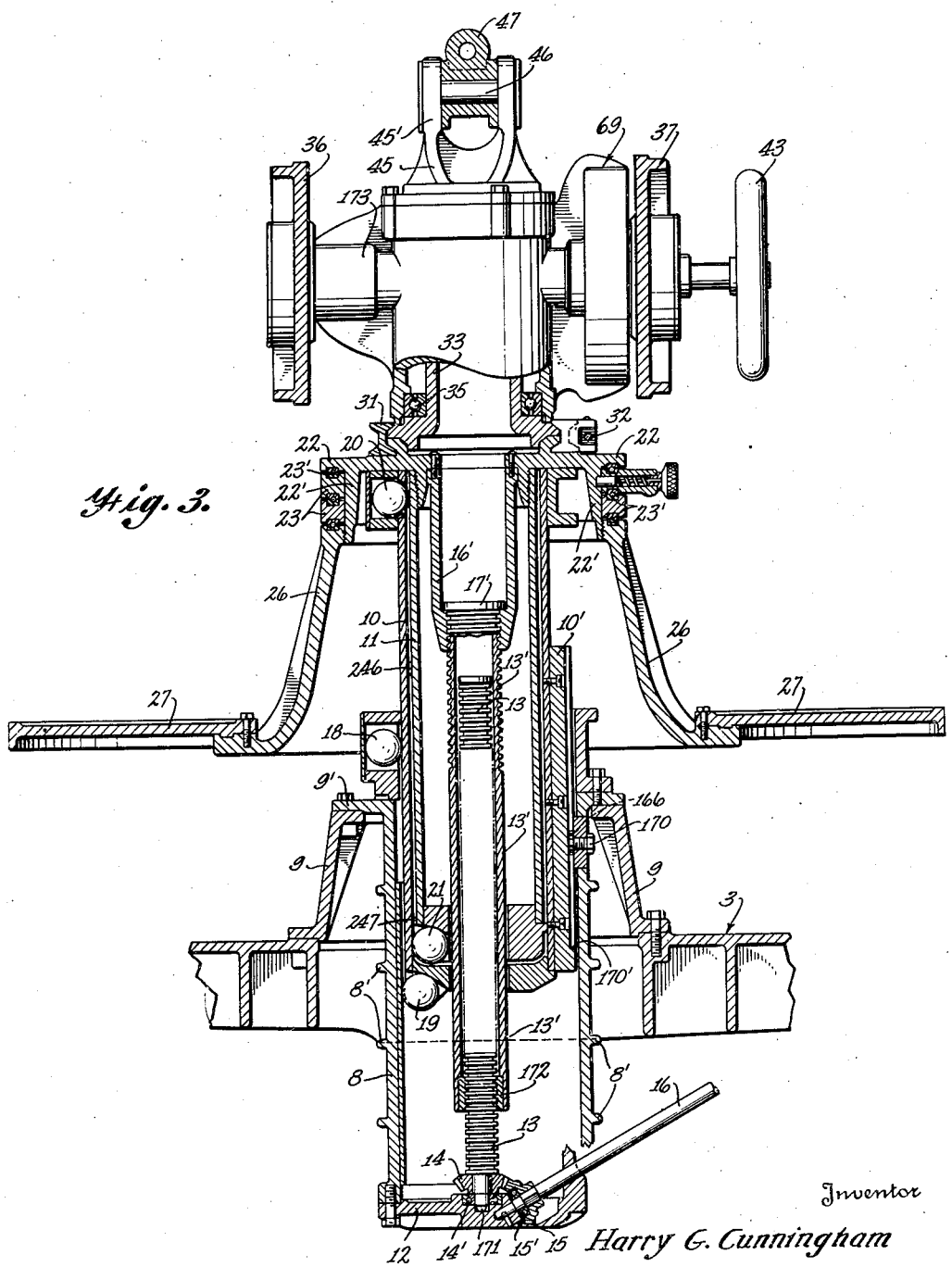

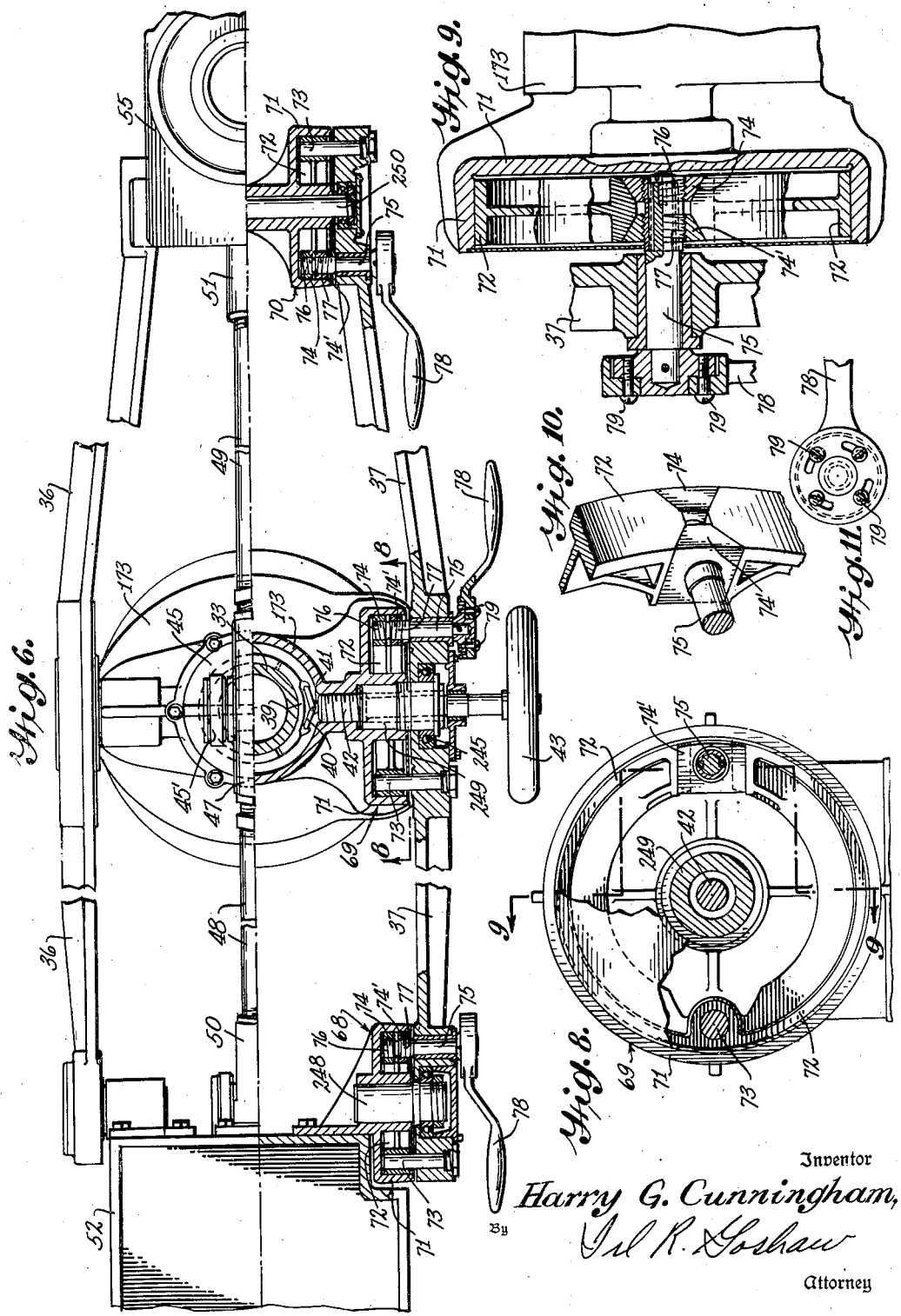

Dec. 17, 1940.    H. G. CUNNINGHAM    2,224,901
CAMERA DOLLY
Filed July 20, 1937    7 Sheets-Sheet 5
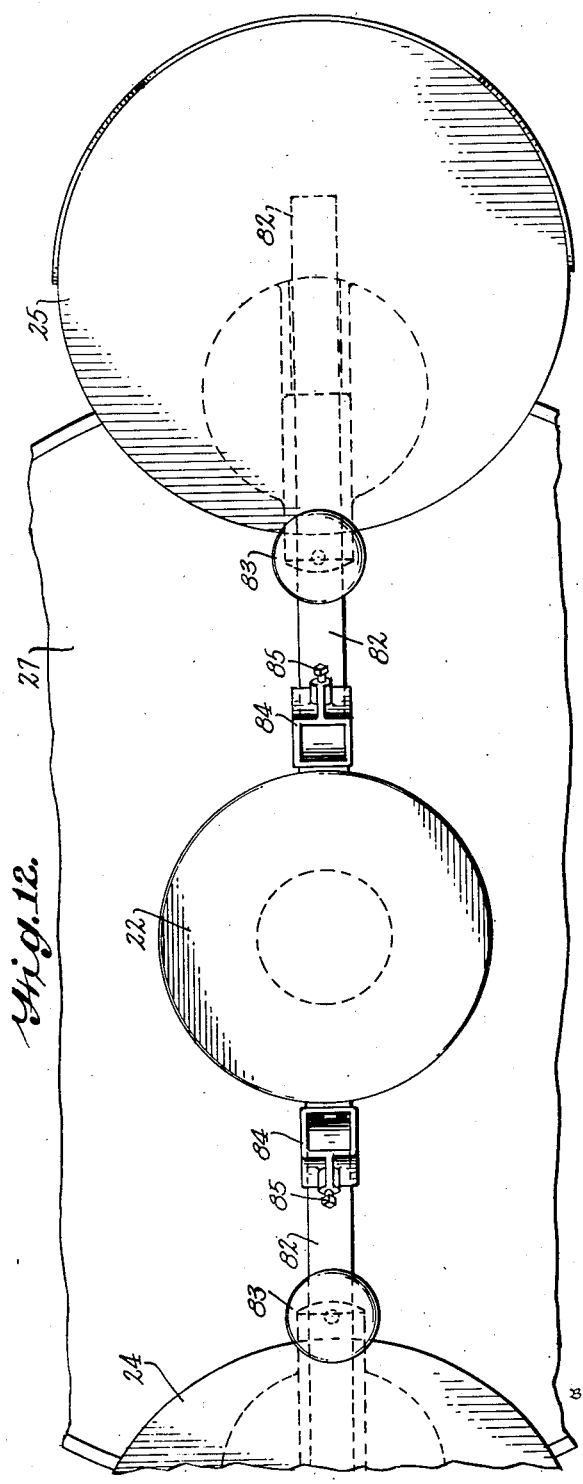
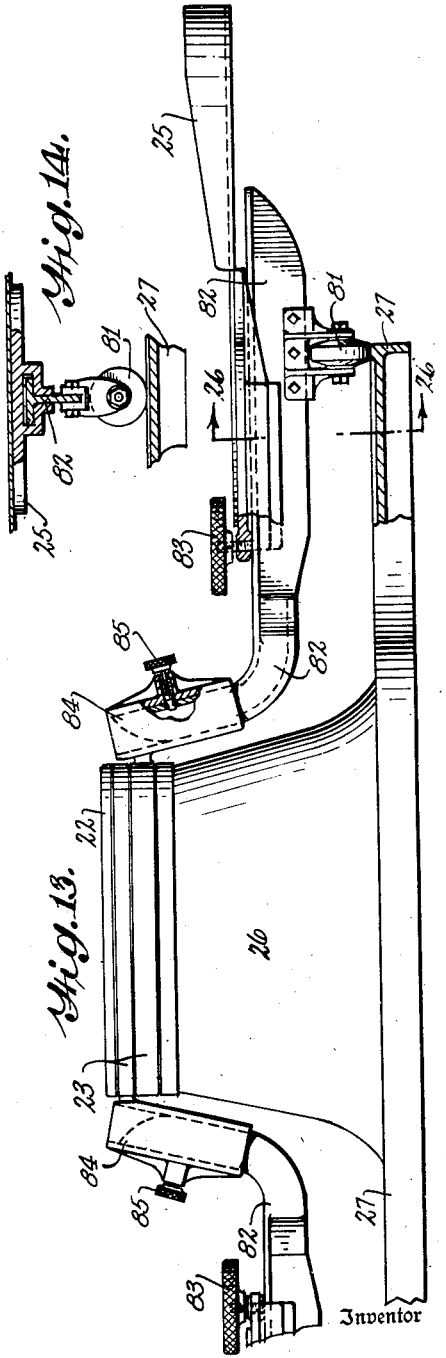
Inventor
Harry G. Cunningham,
BY
Attorney Dec. 17, 1940. H. G. CUNNINGHAM 2,224,901
CAMERA DOLLY
Filed July 20, 1937 7 Sheets-Sheet 6
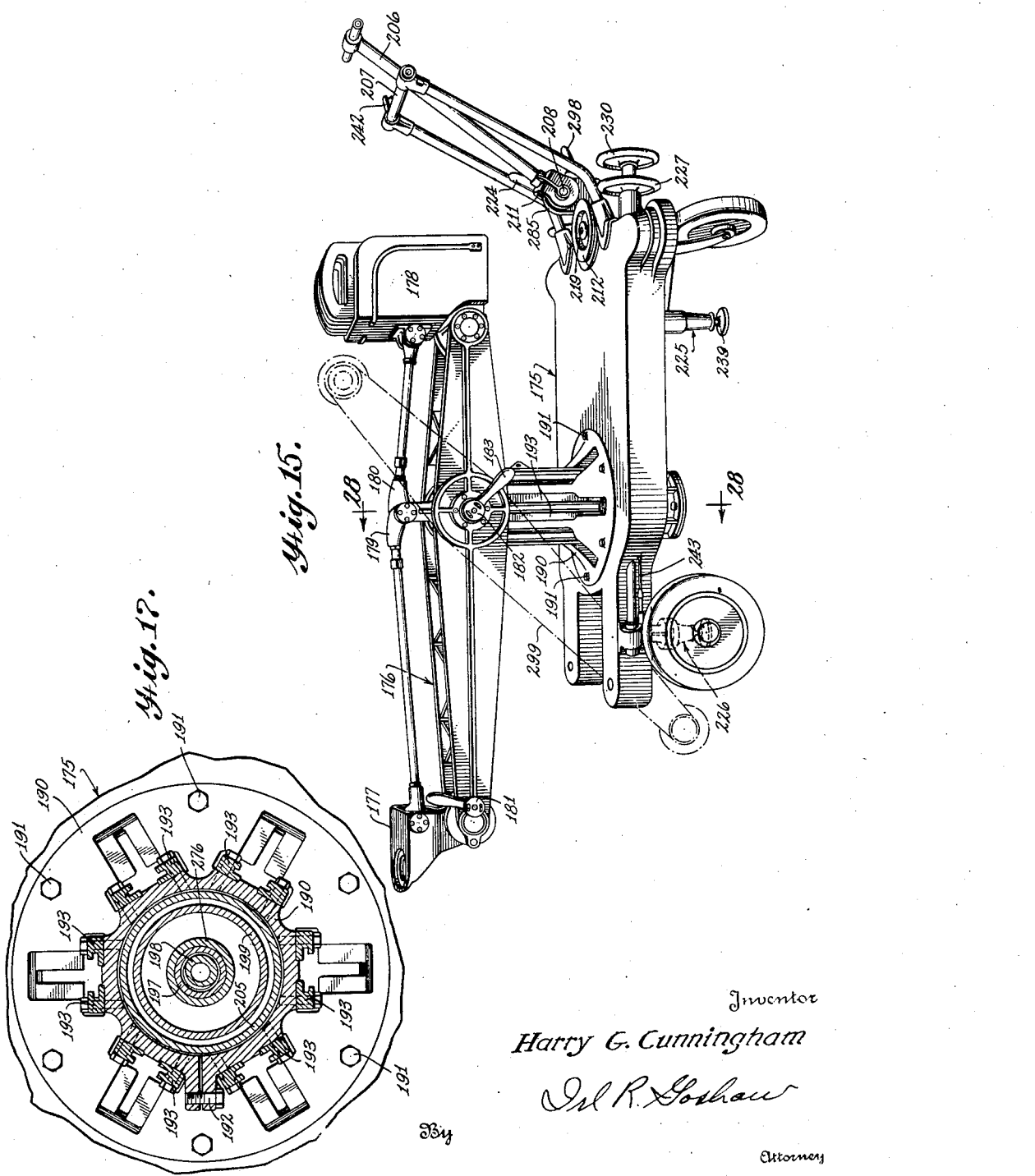
Inventor
Harry G. Cunningham
By
Attorney Inventor
Harry G. Cunningham Patented Dec. 17, 1940

2,224,901

UNITED STATES PATENT OFFICE 2,224,901

CAMERA DOLLY

Harry G. Cunningham, Los Angeles, Calif., assignor to Radio Keith Orpheum Corporation, a corporation of Maryland Application July 20, 1937, Serial No. 154,587

10 Claims. (Cl. 248—123)

This invention relates to motion picture apparatus and particularly to a motion picture camera truck or dolly wherein the camera may be adjusted vertically and horizontally or in any combination of the two motions.

The principal object of the invention is to facilitate the bodily transition or movement of a motion picture camera within a given area.

Another object of the invention is to facilitate the adjustment of a camera with respect to height and lateral placement within a certain area to be photographed and to facilitate the transportation of the adjusting mechanism from place to place without undue loss of time and without affecting the stability of the mechanism.

A further object of the invention is to facilitate the control of the adjusting mechanism and to spatially dispose the controls for convenient access.

A still further object of the invention is to provide a steering control which will permit movement of the dolly in a straight line in any direction or along any curved path.

Camera trucks and dollies are well known in the art even to those of the general nature of this invention, which, in brief, is a dolly having wheels for transporting it and its camera from place to place, and a boom with an elevating mechanism for the boom and camera, the boom being rotatable and tiltable. The fundamental requirements of such a motion picture camera dolly are sturdiness, flexibility as to movement from place to place, stability when operating the camera during "takes" and simplicity insofar as adjustment controls are concerned. The present invention embodies all these features, while simplifying the various elements and arranging the controls more advantageously than heretofore.

In present-day motion picture practice the motion picture camera and the equipment directly associated therewith is of considerable weight inasmuch as it not only includes the camera mechanism, with its view finder, lens shade and immediate camera accessories, but also a soundproof housing or blimp which entirely surrounds the camera mechanism to prevent the noise of the operating mechanism from reaching the recording microphone. Thus the dolly must be sufficiently sturdy to support this weight. With a dolly of the boom type, having the camera supported at the end thereof, it is realized that a construction must be provided to not only support this weight, but also a counter-balance of equal or greater reaction depending upon the pivot position of the boom. Furthermore, the cameraman and/or his assistant must operate the camera, and, therefore, their weights are added either directly on the boom itself or at least upon the truck portion of the dolly.

Other problems involved in facilitating the movement or bodily transition of the camera during a "take" is ease and smoothness of rotation, elevation and tilt of the boom for various "pan" shots or such shots taken wherein the camera is moved in a straight line across the set. The dolly must also be able to be moved at various angles for projecting the camera within openings such as windows or doors of the set. In the present dolly construction all of these features have been provided by a construction which not only permits the operator to quickly make the adjustments, but a structure which is simplified to a point where the adjustments may be made quickly, easily, and with the greatest efficacy.

Although the novel features which are believed to be characteristic of this invention will be pointed out with particularity in the claims appending herewith, the manner of its organization and the mode of its operation will be better understood by referring to the following description read in conjunction with the accompanying drawings forming a part thereof, in which:

Fig. 2 is a cross-sectional view taken along line 2—2 of Fig. 1;

Fig. 3 is a cross-sectional view similar to Fig. 2 with the elevating mechanism in a second position;

Figure 1:
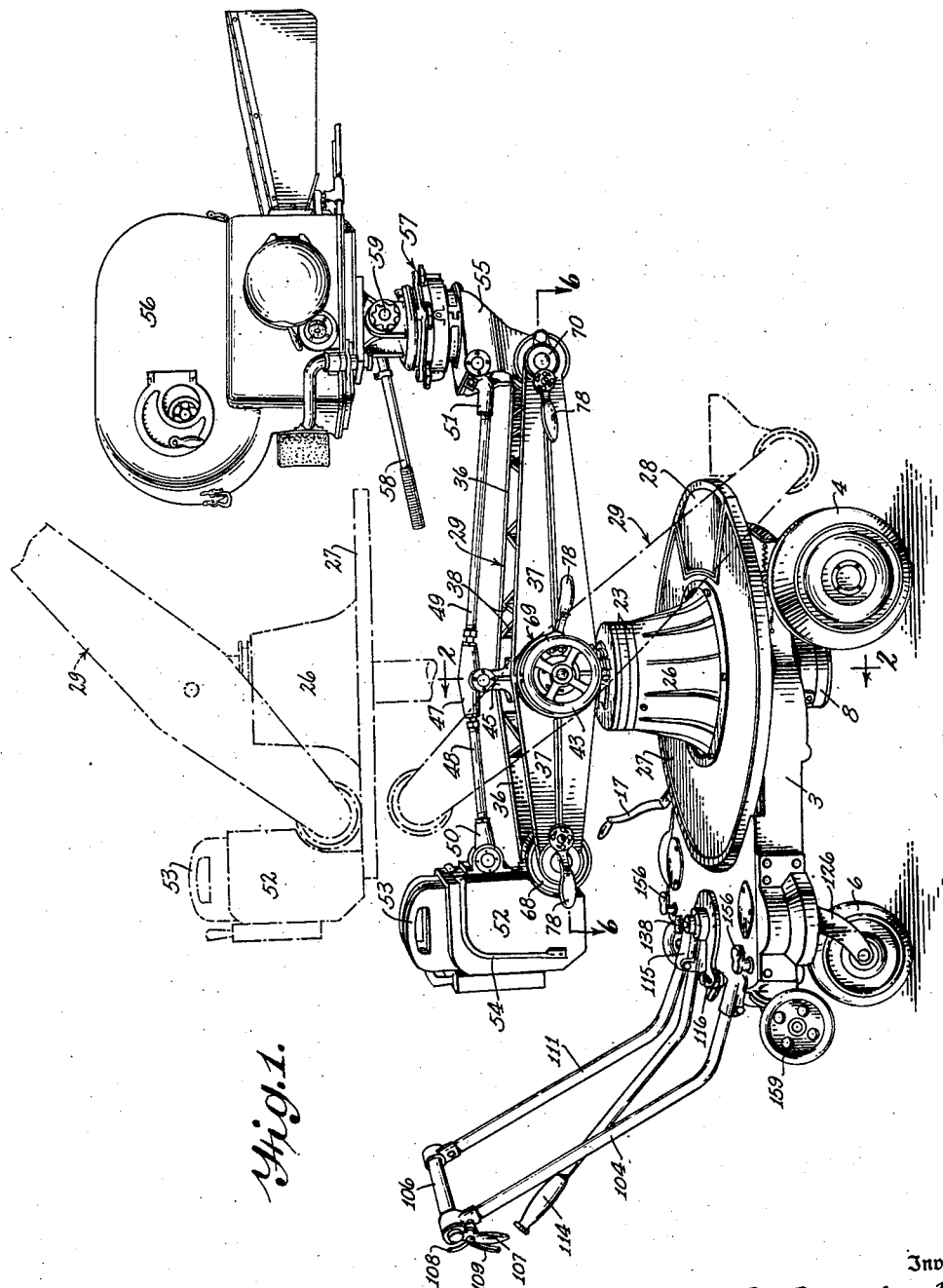
Fig. 1 is a perspective view of one embodiment of the invention showing two positions of the camera boom in dotted lines.
Figure 16:
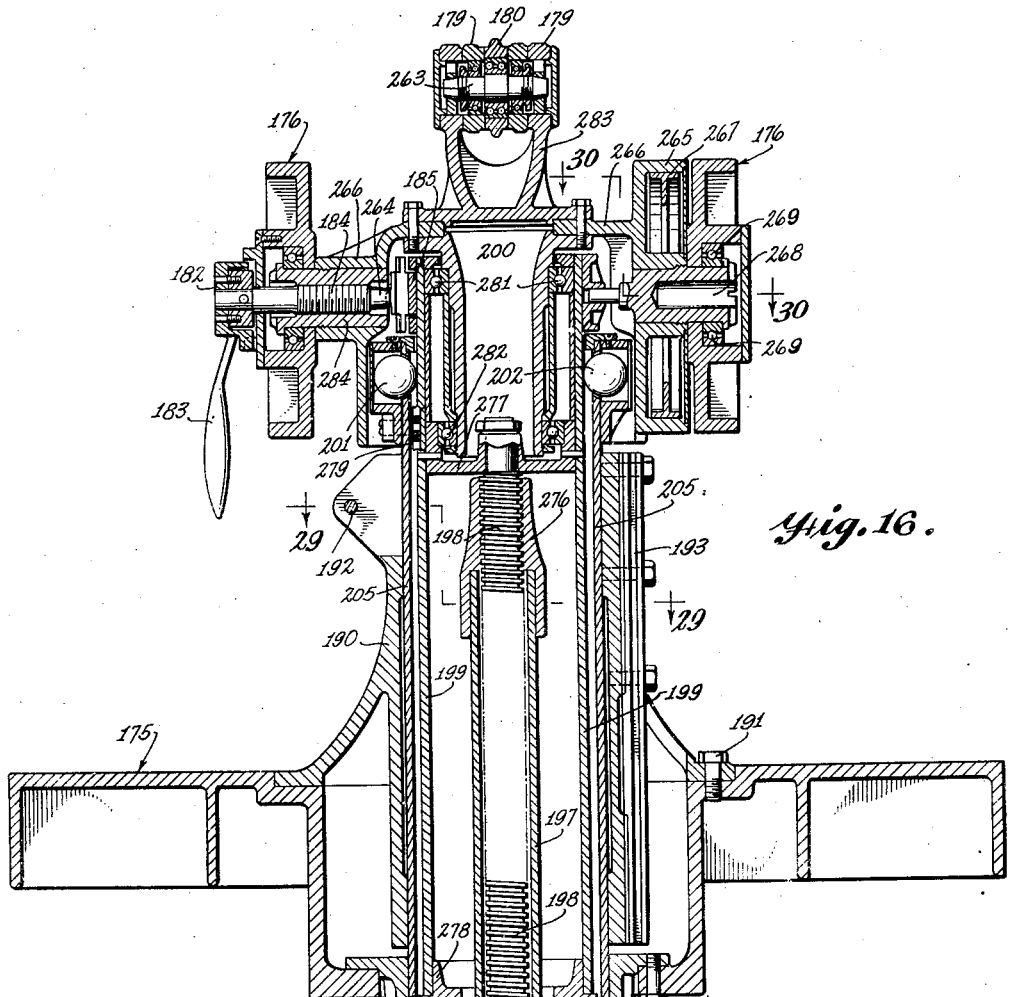
Figure 18:
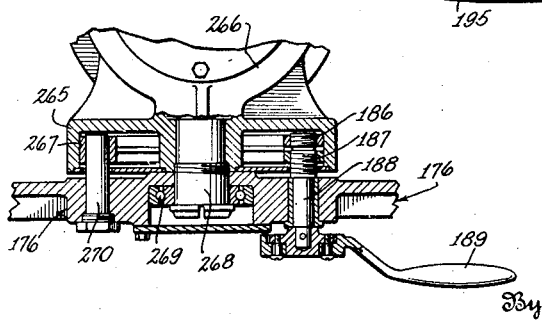

Figs. 4 and 5 are cross-sectional views along the line 4—4 and line 5—5, respectively, of Fig. 2;

Fig. 6 is a sectional view partly in cross-section taken along the line 6—6 of Fig. 1;

Fig. 7 is a detail view of the pan brake mechanism shown at the center of Fig. 6;

Fig. 8 is a cross-sectional view of the brake mechanism taken along the line 8—8 of Fig. 6;

Fig. 9 is a cross-sectional view of the same brake mechanism taken along the line 9—9 of Fig. 9;

Fig. 10 is a perspective view of the actuating mechanism of the brake of Figs. 8 and 9;

Fig. 11 is a detail view of the mechanism for adjusting the handle of the brake of Figs. 8 and 9;

Figs. 12 and 13 are plan and elevational views, respectively, of the seat arrangement for the camera dolly of Fig. 1;

Fig. 14 is a detailed view of the roller supporting the seat as seen along line 26—26 of Fig. 13;

Fig. 15 is a perspective view of a second embodiment of the invention, a second position of the boom being shown in dotted lines;

Fig. 16 is a cross-sectional view of the elevating mechanism of the embodiment shown in Fig. 15 and taken along the line 28—28 of Fig. 15;

Fig. 17 is a cross-sectional view of the supporting column taken along the line 29—29 of Fig. 16; and Fig. 18 is a cross-sectional view of the tilt brake mechanism taken along the line 30—30 of Fig. 16.

Referring now to the drawings in which like numerals indicate similar elements and particularly to Fig. 1 showing the first embodiment of the invention, a frame 3 of substantially rectangular shape is mounted on two front wheels one of which is shown at 4 and two rear wheels one of which is shown at 6. Mounted in an opening in the forward portion of the frame 3 is a cylindrical housing 8 having strengthening ribs 8' (see Fig. 2). The upper portion of the housing 8 has a horizontal flange 9' bolted to Z-type bracket members 9 which, in turn, are bolted to frame 3. Concentrically disposed within the housing 8 are two telescoping cylindrical column members 10 and 11 which are adapted to be raised vertically, as will be explained hereinafter. As shown in Fig. 4, the outer column member 10 is held in non-rotational relationship with respect to the member 8 by a block strip 10' bolted to column 10 and positioned between bearings 165 and 166 held in position by a cover plate 167 mounted on housing 8 by shaft bolts 168 locked by set screws 169. This strip 10' serves as a vertical guide for the column 10. A view of block strip 10' and housing 8 at a lower position is shown in Fig. 5. A stop bolt 170 extending into a slot in block strip 10' serves to limit the upper movement of column 10 when the closed end 170' contacts the bolt.

Bolted to the housing 8 at its lower end is a bottom section 12 on which is supported a threaded screw 13 with a ball point 171 to carry the weight of the apparatus supported by the screw 13. The screw 13 has mounted at its lower end bevel gear 14 intermeshed with a second bevel gear 15 mounted on respective bearings 14' and 15'. The gear 15 is rotated by means of a shaft 16 extending upwardly at an angle through the frame 3 and having mounted on the end thereof a hand-crank 17 for manual operation. Immediately surrounding the screw 13 is a cylindrical sleeve member 13' having its upper end threaded exteriorly, the threads meshing with the interiorly threaded portion of a downwardly extending cylindrical member 16'. The lower end of sleeve member 13' carries a block 172 internally threaded to mesh with the external threads of screw 13. Member 13' has a cap member 17' with projecting shoulders to contact an inner shoulder portion of the threaded member 16'. In this manner a stop is provided for the threading action of the external threads of member 13' and the threads of member 16' as shown more clearly in Fig. 3.

The outer cylindrical sleeve member 10 is movable upwardly and supported laterally by six upper ball bearings, one of which is shown at 18, the opposite side being shown out of position to more clearly illustrate the construction. These bearings remain stationary to accommodate the thrust action of the camera boom, while a lower set of six ball bearings, one of which is shown at 19, is adapted to accommodate the lateral thrust action at the lower end of column 10, these bearings being movable with the column. The inner column 11 is movable upwardly within the column 10 and is adapted to extend outside the upper end of column 10. Similar bearings, one of which is shown at 20 and 21, accommodate the thrust action of column 11, the upper bearings being carried by column 10 and the lower ones by column 11. A stop 246, shown out of position, is provided on the inner surface of column 10 to contact the ear 247 at bearing 21 to limit the upper motion of column 11 within column 10. To provide a guide for column 11 and to prevent rotation of column 10 within column 11, two strips 300 and 301 are riveted longitudinally to the inside wall of column 10 and a strip 302 is riveted to the outside wall of column 11 and positioned between strips 300 and 301.

Threaded to the internal cylinder 11 at its upper end is a cylindrical platform 22 with a depending flange 22', to the lower edge of which is threaded an apron member 26 to which is bolted a circular platform 27 with a removable section 28 (see Fig. 1). Disposed around flange 22' are two rings 23 separated from each other and from the flange 22' and top of apron 26 by ball bearings 23', permitting rotation of the rings or any member attached thereto, such as seats 24 and 25 (see Fig. 12). Each ring may be locked in position by a spring-pressed plunger, one of which is shown at 23'', the inner end of which is accommodated in holes provided in the flange 22'. The cylindrical extension 16' is also bolted to the platform 22, forming the connection between the raising mechanism and the columns 10 and 11.

On the upper surface of member 22 projects a flange 30 upon which is mounted an upright cylindrical column member 33 held to platform 22 by an I-ring 31 clamped in place by clamp 32. Rotatably mounted on the member 33 by bearings 34 and 35 is a casting 173 having bearing portions at the ends thereof to mount bearings 174 and 245 which carry boom side members 36 and 37 interlaced together by brackets 38 as shown in Fig. 1. The boom is therefore rotatable about a vertical axis on the bearings 34 and 35, and tiltable about a horizontal axis on bearings 174 and 245. To lock the boom in any desired rotated position, a brake band 39, with overlapping ends as shown in Figs. 6 and 7, is provided. As shown in these figures, two link members 40 connect the overlapped ends of the brake to a center ball member 41 which is urged toward the member 33 by screw 42 operated by handwheel 43 to tighten the band 39 about member 33 to provide the braking action. The brake is maintained in position by a collar 44 on the member 33.

Mounted above the member 33 and bolted to casting 173 is a plate 45 having an upper yoke section 45' into which is mounted a bearing axle 46 on ball bearings 46'. Axle 46 forms the center mounting of an equalizing rod knuckle 47 into which is threaded rods 48 and 49 which, in turn, are threaded into end knuckles 50 and 51, respectively (see Fig. 1). The rods 48 and 49 have right- and left-hand threads at the ends thereof to adjust the respective vertical positions of a weight carrier box 52 shown with lead weights 53 therein and a handle rod 54 thereon, and that of a camera supporting plate 55 which is pivoted at the forward end of the brake. It is believed the action of the equalizer is well understood and will not be further described except to say that for all angular tilt positions of the boom 29 the upper surface of the camera plate 55 will remain horizontal, the same being true of the weight box 52.

Mounted within an enlarged portion of casting 173 is a brake drum 71 with a brake band 72 which will be further described in connection with Figs. 8, 9 and 10. Discussing now the operation of the elevating mechanism which carries the boom upwardly, let us assume that the mechanism is at its extreme lowest position as shown in Fig. 2. Upon actuation of the crank 17, thus rotating screw 13, one of two actions may occur according to the friction between actuated elements, and it is immaterial in what order they occur. As shown in Fig. 3 the screw 13 has rotated cylindrical member 13', which caused the projecting cylindrical member 16' to move upwardly to its full extent, carrying the platform 22 and both columns 10 and 11 with it. The sleeve 10 slid along its bearings 18 and 19. The sleeve 16' was stopped by the internal shoulder abutting the collar 17' at the top of the cylinder 13'. At this point, rotation of the element 13' was stopped while continued rotation of the screw 13 moved the block 16' upwardly continuing the upward movement. As the raising continues, stop screw 170 will stop the upward movement of column 10, but the inner column 11 will continue to rise upwardly within column 10 on bearings 20 and 21 until ear 247 contacts projection 246, thus stopping any further upward motion. As stated above, the action may also occur differently, such that the screw 13 first turns with member 13' and then 13' rotates within member 16'. Also, column 11 may first move upwardly inside column 10 and then column 10 follow thereafter. In any event, it is immaterial in what order these movements occur, as the boom is operative regardless of the relative positions of the columns or threaded members. There is thus provided a telescoping action with a ratio which permits a man to elevate the entire boom, camera and counterweight as well as a cameraman or assistant cameraman who happens to be on the platform 27.

As shown in Fig. 1, a camera 56 of any type may be mounted directly upon the platform 55, but preferably a leveling device shown generally at 57 is interposed therebetween. As the camera plays no part in the present invention, further details thereof will not be described. It will suffice to say that the camera is mounted for tilting action about a pivot axis 59 to be actuated by a hand rod 58.

Referring now to Figs. 1, 2, 6, 8, 9, 10 and 11 in which the tilt brakes are illustrated in detail, it will be observed that there are three such brakes, one located at the rear of the boom at 68, one at the pivot point of the boom at 69, and one at the front end of the boom at 70. These brakes are similar to one another but of a different type than that of the pan brake, and the detailed drawings of Figs. 8, 9 and 10 fully show their operation, as will now be described. Brake drums are provided, as shown in Figs. 8 and 9, at 71 with internally expanding brake shoes 72 mounted at 73 and separated diametrically opposite 73 by opposed tapered members 74 and 74'. The tapered members 74 and 74' are threaded upon a rotatable shaft 75 carrying right- and left-hand threads 76 and 77.

The shaft 75 is actuated by respective handles 78 which are adjustable on the shaft 75 for varying the positions of the handles. This adjustment is accomplished with a plurality of screws 79 in cooperation with slots in the circular portion of the handle, as shown in Fig. 11. By turning any one of the handles 78, the rod 75 is rotated, the left-hand screw 77, looking at Fig. 9, urging the left-hand wedge 74' toward the right-hand wedge 74, while the right-hand wedge is being urged toward the left-hand wedge by right-hand screw 76. The movement of the wedges toward one another separates the ends of the brake shoes 72, thus binding them against the brake drums 71 to lock the boom in any desired tilt position. This is possible inasmuch as the rear end brake 68 has its drum attached to the weight box 52, which always has a vertical position, while the shoe is mounted to the boom frame 37 by stud 248. In the case of the center brake 69, the brake drum is fixed by being a part of casting 173, while the shoe of this brake is mounted around a quill 249 (see Fig. 6). For brake 70, the drum forms a part of the camera plate 55, which always has a vertical position, and the shoe therefor is mounted around stud 250. That is, three brakes are presented to the operator, each being independent of one another but each sufficient to securely lock the boom in any tilt position.

Referring now to Figs. 12 and 13 showing the cameraman seats 24 and 25, there are two of these shown diametrically opposed to one another, seat 24 being mounted on the upper of the rings 23, and seat 25 being mounted on the lower of the rings 23. Each seat, therefore, may be independently moved about the apron 26 and over the platform 27, since the rings are mounted on ball bearings 23' (see Fig. 2), and the weight of the seats and load is carried on wheels as shown at 81. The wheels 81 roll on a rail formed of a slightly upraised circumferential portion of platform 27. The seats are adjustable radially from the center of the boom by sliding them in a groove on a frame 82 and locking them in any adjusted position by knurled nuts 83. The frames 82 have upturned ends which are inserted within brackets 84 connected to the rings so that the frames are removable at will, the upturned portions 82 having holes therein in which are inserted pins controlled by knurled nuts 85' as shown in Fig. 13. There is thus provided independent rotatable seats for the cameraman or assistant cameraman which are adjustable rotatably about the boom independently of the boom's position, and at the same time adjustable away from the rotatable axis of the boom to an optimum position for operating the camera. If the seats are not desired, they may be readily removed and the operators can then stand upon the plate 27.

The steering mechanism for the dolly wheels, two of which are shown at 4 and 6 in Fig. 1, is disclosed and claimed in divisional application Serial No. 215,614, filed June 24, 1938. The rear wheels of the dolly are caster-mounted upon yokes, one of which is shown at 126. The divisional application describes the function of the fixed tubular handles 104 and 111 with the tubular cross bar 106 for maneuvering the dolly from place to place. The cross bar 106 contains a shaft having a handle 107 mounted thereon for applying brakes to the dolly, the handle being slidable on a curved member 108, to which the handle 107 may be locked by a lever 109. The dolly is steered by a steering handle 114 placed midway between the members 104 and 111 and connected to a rotatable member 115 having a quadrant section 116 for locking the wheels in different steering positions. In Fig. 1 is shown the upper end 138 of an adjustable rod for providing different steering arrangements for the wheels. The dolly is provided with jacks at the rear portion of the frame 3 for stabilizing the camera at certain shooting locations, the hand wheel for one of these jacks being shown at 159. The jacks are maintained horizontally when not in use by set screws operated by handles 156.

In the second embodiment of the invention, as illustrated in the remaining figures, namely, 15 to 18, inclusive, a camera dolly is disclosed having all the features of the first embodiment together with several improvements to facilitate the control of the various adjustments. Referring now to these figures and particularly Fig. 15, a frame or bedplate 175 is supported by four wheels similar to the wheels of the dolly of Fig. 1. The boom 176 is also similar to the boom 29 of Fig. 1, boom 176 having a similar camera supporting plate 177 and weight box 178.

The equalizing rod above the boom in the present embodiment is constructed differently from that of Fig. 1 to the extent that the knuckle above the pivot point of the boom is formed in two parts or is jointed as shown more clearly in Fig. 16. The forward knuckle 179 is in the form of a yoke to accommodate a narrowed portion of the rear knuckle 180 which dovetails therewith around the axle 263. This improvement permits easier alignment of the equalizer and facilitates assembling of the dolly. The boom 176 is equipped with tilt and pan brakes, there being two tilt brakes, one shown at 181 and a similar brake located at the pivot point of the boom but on the opposite side from a pan brake 182. Pan brake 182 is similar to pan brake 39 of the first embodiment, and is shown in Fig. 16 as having a handle 183 with a threaded screw 184 which has a contact end 264 for bearing against the links connecting the ends of the brake band shown in cross-section at 185. The tilt brakes are similar to the tilt brakes of the boom of Fig. 1 and have left- and right-hand screws 186 and 187 on a shaft 188 operated by a handle 189 as shown in Fig. 18. This cross-section is of the tilt brake located at the pivot point of the boom, the drum 265 being integral with boom supporting casting 266 and the brake shoe 267 being mounted on the side of the boom by stud 268 carrying ball bearings 269 on which the boom 176 tilts. A stud 270 supports the shoe diametrically opposite the shaft 188.

In Fig. 17 a cross-section of the elevating mechanism and exterior housing therefor is shown, and now referring to this figure and Fig. 16, a circular split apron member 190 is bolted to the bedplate 175 by bolts 191, the apron being tightened about a column member 205 by a bolt 192. Slotted members shown in cross-section at 193 may be inserted in the rib-like sections of the apron 190 for the purpose of providing longitudinal slots for mounting a platform or seats.

The elevating mechanism of this embodiment is similar in many respects to that of Fig. 1 but differs in employing fewer parts, thus reducing friction to a minimum. A similar hand-operated rod 194, having a set of bevel gears 195 and 196 actuated thereby, serves to revolve a cylindrical shaft member 197 pinned to gear 196, the member 197 having attached thereto at its upper end an internally threaded member 276, the threads of which mesh with a vertical screw 198. Rotation of the shaft 197 about the screw 198 moves the screw 198 upwardly from its position as shown in Fig. 16. Attached to the top of screw 198 is a cross member 277 to which is pinned a cylindrical column 199 having a bottom member 278 upon which are mounted ball bearings 203. Similar bearings 201 and 202 mounted on fixed column 205 together with bearings 203 serve as lateral support bearings for the boom as column 199 is moved up and down. A bearing 279 shown out of position is mounted on the inside of fixed column 205 and has a guide mounted on column 199 operating therein to keep the cylinder 199 from rotating. The guide extends down to shoulder 280 of bottom member 278, which serves as a limit stop.

Mounted internally of the upper portion of movable column 199 are roller bearings 281 and 282 upon which a shaft member 200 rotates. Member 200 has bolted to its upper end a depending casting 266 and an upper yoke casting 283. The casting 283 supports axle pin 263 for equalizing knuckles 179 and 180. Casting 266 carries axle studs 263 and 284 upon which the boom is supported and tilted. The elevating mechanism functions, therefore, in the manner of that of Fig. 2, except that one of the actuating threaded members as well as one of the telescoping column members has been eliminated. It also differs from that of Fig. 1 by utilizing a fixed screw instead of a movable one.

Referring again to Fig. 15, it is to be observed that this embodiment has, at the rear of the truck, a steering handle 206 and a moving handle 207 similar to the first embodiment. The steering handle, however, is now adjustable as to tilt, since its yoke end 211 is pivoted at 208 by straddling a member 285 which is integral with cylindrical dished member 212, the latter being set within a depression of the frame 175. Handle 224 locks the steering rod 206 in any desired angular position. This embodiment is steered similarly to the embodiment shown in Fig. 1, one control therefor being shown by the pin 219.

The dolly structure of Fig. 15 employs four jacks for leveling the frame during the shooting of a scene, one of the rear jacks being shown at 225 with its contact shoe 239, and one of the front jacks being shown by the dotted lines 226, the front jack 226 being controlled by a hand wheel 230, and the rear jack 225 being controlled by a hand wheel 227.

A brake system for this modification is also employed as shown by the lever 242 and the cable 243 in Fig. 15. This brake system is similar to that of the modification shown in Fig. 1. The elevating crank mechanism also extends toward the rear of the truck and is operated by handle 298 shown in Fig. 15.

It is to be observed that the main improvements in the second embodiment over the first are in concentrating the controls of the dolly in one place where they are within easy reach of an operator standing in one position. That is, the controls for guiding and moving the truck, elevating the boom, braking the truck and stabilizing the dolly are all placed at the rear of the dolly. A plurality of tilting brake controls and a pan brake are provided for easy access. The dolly operator is, therefore, enabled to quickly move the dolly in any desired manner as well as raise, lower, rotate and tilt the boom quickly and conveniently. In the second modification, the circular platform has been eliminated while the bedplate 175 has its front end cut back to permit lowering of the front end of the boom beyond the level of the frame 175 as shown by the dotted lines 299 of Fig. 15.

I claim:

1. A camera dolly comprising a platform, supporting means for said platform, a vertical column mounted on said platform, said column being adapted to be raised and lowered, a boom manually tiltable and rotatable at the upper end of said column, said boom having a camera support at one end thereof and a counter-balance support at the other end thereof, manually operative means mounted on said boom and said column for locking said boom in any adjusted tilted position with respect to said column, and manually operative means mounted on said boom and said column for locking said boom in any adjusted rotated position with respect to said column.

2. In a camera dolly construction, the combination of a platform, supporting means for said platform, a camera boom having a camera support at one end thereof and a counter-balance at the other end thereof, a vertical column mounted on said platform at the upper end of which said boom is pivotally and rotatably mounted on respective pivotal and rotatable points and adapted to be moved by manual pressure thereon, and elevating means for said column comprising a vertical exteriorly threaded screw within said column, and a cylinder adapted to rotate about said screw for raising and lowering said column and said boom, said screw having a thread pitch adapted to maintain the pivot and rotatable points of said boom fixedly in any adjusted position during pivoting and rotation of said boom.

3. A camera dolly structure comprising a frame, a platform on said frame, a cylindrical housing mounted on said platform having a vertically adjustable column therein, a second column surrounding said first column and having a substantially circular housing mounted at the upper end thereof, bearings to permit telescoping of said first and second mentioned columns and said housing and for preventing lateral movement therebetween, a platform depending from said circular housing, said circular housing and platform being adjustable vertically with one of said columns, a counter-balanced boom pivotally and rotatably mounted on said circular housing and adapted for direct manual movement, manually operative independent means for locking said boom to said circular housing in any adjusted angular position, and manually operative independent means for locking said boom to said circular housing in any rotated position, said boom being relatively rotatable and tiltable with respect to said depending platform.

4. A camera dolly structure comprising a substantially horizontal frame member, a vertically arranged cylindrical column member attached to said frame member, a second vertically arranged column member adapted to be moved vertically within said first column member, vertically arranged screw means within said second column for actuating said movable column member, the ratio of said screw means being adapted to automatically maintain said second column member in any adjusted position, bearings permitting relative longitudinal movement between said column members without lateral movement therebetween, a boom mounted on said movable column member and adapted to be manually rotated and tilted on said member, a plurality of rotatable members mounted on said movable column member, a platform member mounted on said movable column member and adapted to be moved vertically therewith, and a plurality of demountable seat members attached to respective rotatable members, said seat members being adapted to be individually rotated about said column member at all positions of said movable column member during movement of said boom by an operator seated on said seat members.

5. A camera dolly construction comprising a frame member having a cut-away portion therein, a column member mounted on said frame member and within an aperture therein, a movable column within said fixed column and adapted to be raised and lowered, a boom mounted on said movable column and adapted to be rotated and tilted by direct manual pressure on said boom, said boom being adapted to pass into the cutaway portion of said frame in one tilt position, a camera supporting plate on one end of said boom, an adjustable counter-balance mounted on the other end of said boom, an equalizer rod for interconnecting said counter-balance and camera supporting plate to maintain said counter-balance and plate in the same relative positions with respect to a horizontal, manually operative braking means mounted on said boom and said movable column member for locking said boom to said movable column member in any tilt position, and a manually operative brake mounted on said boom and said movable column member for locking said boom to said movable column member in any rotated position.

6. A camera dolly construction comprising a substantially horizontal platform frame member, a vertical column member mounted on said frame member substantially at the center thereof, a second column member adapted to be telescoped within said first column member, a boom having pivot and rotatable mountings on the upper end of said telescoping column member, said boom being adapted to be manually rotated and tilted, a camera supporting plate at one end of said boom, a counter-balance at the other end of said boom, means inter-connecting said camera plate and counter-balance for maintaining them in the same relative positions with respect to a horizontal for any tilt position of said boom, a brake drum fixedly mounted with respect to said camera plate, a cooperating brake band fixedly mounted with respect to said boom, manually operative means for causing engagement of said band with said drum to lock said boom in tilt position, a brake band surrounding said telescoping column member and attached to said boom and manually operative means for causing said brake band to contact said telescoping column member to lock said boom in any rotated position.

7. A camera boom construction comprising a substantially horizontal frame plate, a vertical column attached to said frame at approximately the center thereof, a column member within said attached column member and adapted to be raised and lowered, screw means for raising and lowering said column member, the ratio of said screw means being adapted to maintain said column member in any raised position, and a counter-balanced camera boom mounted on said movable member, said boom being adapted to be manually tilted and rotated by pressure directly applied thereto.

8. A camera dolly comprising the combination of a frame, a plurality of cylindrical column members, one of which is fixedly attached to said frame, means for vertically adjusting a second of said column members, a boom mounted on the upper end of said second column member, said boom being adapted to support a camera at one end thereof and a counterweight at the other end thereof, said boom being freely rotatable and tiltable on said second column member by manual pressure directly applied to said boom, and a platform attached to said second column member and vertically adjustable therewith for supporting an operator during rotating and tilting of said boom by said operator.

9. A camera dolly construction comprising a mobile frame, telescoping means attached to said frame, a boom mounted at the upper end of said telescoping means and adapted to support a camera at one end and a counterbalance at the other end thereof, said boom having rotatable and pivotal points for rotating and pivoting said boom about the upper end of said telescoping means, a platform adapted to be raised and lowered with the pivot and rotatable points of said boom but which remains fixed during rotation and tilting of said boom, and means to lock said boom in position with respect to said platform and telescoping means.

10. A camera dolly in accordance with claim 9 in which said last-mentioned means includes manually operable brakes mounted on said boom and associated with said telescoping means for locking said boom in any adjusted rotational or pivoted position, said brakes being within reach of an operator on said platform.

HARRY G. CUNNINGHAM.